(12) United States Patent
Mason

(10) Patent No.: US 10,515,374 B2
(45) Date of Patent: Dec. 24, 2019

(54) KEYWORD GENERATION METHOD AND APPARATUS

(75) Inventor: Zachary Mason, Palo Alto, CA (US)

(73) Assignee: Adobe Inc., San Jose, CA (US)

( * ) Notice: Subject to any disclaimer, the term of this patent is extended or adjusted under 35 U.S.C. 154(b) by 2209 days.

(21) Appl. No.: 11/371,267

(22) Filed: Mar. 8, 2006

(65) Prior Publication Data

US 2006/0206516 A1    Sep. 14, 2006

Related U.S. Application Data

(60) Provisional application No. 60/660,580, filed on Mar. 10, 2005, provisional application No. 60/660,581, filed on Mar. 10, 2005.

(51) Int. Cl.
G06Q 30/00 (2012.01)
G06F 17/30 (2006.01)
G06Q 30/02 (2012.01)

(52) U.S. Cl.
CPC .................... G06Q 30/02 (2013.01)

(58) Field of Classification Search
CPC .................. G06Q 30/0201–30/0277
See application file for complete search history.

(56) References Cited

U.S. PATENT DOCUMENTS

| | | | |
|---|---|---|---|
| 6,473,084 B1 | 10/2002 | Phillips et al. | |
| 7,017,110 B1* | 3/2006 | Chi | G06F 17/30855 707/E17.013 |
| 7,493,253 B1* | 2/2009 | Ceusters et al. | 704/9 |
| 8,626,576 B1* | 1/2014 | Pisaris-Henderson | G06Q 30/0241 705/14.1 |
| 2002/0016786 A1* | 2/2002 | Pitkow et al. | 707/3 |
| 2003/0078913 A1* | 4/2003 | McGreevy | 707/3 |
| 2003/0220866 A1 | 11/2003 | Pisaris-Henderson et al. | |
| 2004/0024755 A1* | 2/2004 | Rickard | 707/3 |
| 2004/0186776 A1 | 9/2004 | Llach | |
| 2004/0204983 A1* | 10/2004 | Shen et al. | 705/10 |
| 2004/0225562 A1 | 11/2004 | Turner | |
| 2004/0236725 A1* | 11/2004 | Amitay et al. | 707/3 |
| 2005/0144068 A1 | 4/2005 | Calabria et al. | |
| 2005/0114198 A1* | 5/2005 | Koningstein et al. | 705/10 |
| 2005/0216516 A1 | 9/2005 | Calistri-Yeh et al. | |
| 2005/0222901 A1* | 10/2005 | Agarwal | G06F 17/3061 705/14.54 |
| 2005/0288954 A1 | 12/2005 | McCarthy et al. | |

FOREIGN PATENT DOCUMENTS

WO    WO0103041 A1    1/2001

* cited by examiner

*Primary Examiner* — Yehdega Retta

(74) *Attorney, Agent, or Firm* — Kilpatrick Townsend & Stockton LLP

(57) ABSTRACT

Methods, apparatuses, and articles for receiving one or more indicators indicating one or more degrees of relevance or irrelevance of one or more items or entities to advertising keywords of interest, generating one or more advertising keyword suggestions suggesting one or more advertising keywords based at least in part on whether there are predetermined relationships among the suggested one or more advertising keywords, and between some of the suggested one or more advertising keywords and the one or more items or entities, are described herein.

20 Claims, 9 Drawing Sheets

| Keywords | Feature Values | Property Values |
|---|---|---|
| 1 | TRUE | Click-through |
| 2 | 1 | Conversion |
| 3 | 0 | Conversion |
| 4 | TRUE | Click-through |
| 5 | 0 | Click-through |
| 6 | 1 | Conversion |
| 7 | FALSE | Click-through |

Figure 4

KEYWORD GENERATION METHOD AND APPARATUS

RELATED APPLICATIONS

The present application claims priority to U.S. Provisional Application 60/660,580, entitled "Keyword Effectiveness Prediction Method and Apparatus", filed on Mar. 10, 2005, and to U.S. Provisional Application 60/660,581, entitled "Keyword Generation Method and Apparatus", filed on Mar. 10, 2005. The specifications of the 60/660,580 and 60/660,581 provisional applications are hereby fully incorporated by reference.

FIELD OF THE INVENTION

The present invention relates to the field of data processing, in particular, to methods and apparatuses for keyword effectiveness prediction and/or keyword generation, having particular application to advertising with search engines.

BACKGROUND OF THE INVENTION

Search engines exist to make information accessible. Among the kinds of information promulgated by search engines is advertising. The display of advertisements ("ads") is often mediated by a bidding system—an advertiser bids on a keyword, and the placement of his ad on the search result page for that keyword depends on, possibly among other factors, his bid. Often, the click-through rate on the ad is a function of its placement.

It is in an advertiser's interest to know about as many relevant keywords as possible. Manually generating keywords for a domain is a difficult, labor intensive task—for a given topic there can be many keywords. Additionally, the linguistic behavior associated with search is not entirely like any other, and thus may be difficult to intuit. Accordingly, an automated method for generating search keywords for a merchant (or for a domain, or an industry, or a vertical, or a product, etc.) is valuable. It is also valuable to know how well a keyword will serve its purpose in order to bid optimally, both for merchants manually compiling a bidding strategy and for those using mathematical optimization techniques.

BRIEF DESCRIPTION OF THE DRAWINGS

The present invention will be described by way of exemplary embodiments, but not limitations, illustrated in the accompanying drawings in which like references denote similar elements, and in which:

FIG. 4 illustrates an exemplary table for storing refined training data utilized by various components of embodiments of the present invention;

DETAILED DESCRIPTION OF EMBODIMENTS OF THE INVENTION

Illustrative embodiments of the present invention include, but are not limited to, methods and apparatuses for receiving one or more indicators indicating one or more degrees of relevance or irrelevance of one or more items or entities to advertising keywords of interest, generating one or more advertising keyword suggestions suggesting one or more advertising keywords based at least in part on whether there are predetermined relationships among the suggested one or more advertising keywords, and between some of the suggested one or more advertising keywords and the one or more items or entities. Illustrative embodiments of the present invention may also additionally or alternatively compute a predictive measure for an advertising effectiveness metric for each of one or more advertising keywords based at least in part on one or more feature values of the keywords, employing, for example, a prediction function of the effectiveness metric. In various embodiments, the prediction function may have been generated based on a plurality of other keywords and feature values of the one or more features of the other keywords.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

As used throughout the application, the term "keyword" may refer to any word, string, token, phrase, or collection of words, strings, tokens, or linguistic constructs that may be searched upon by a user.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
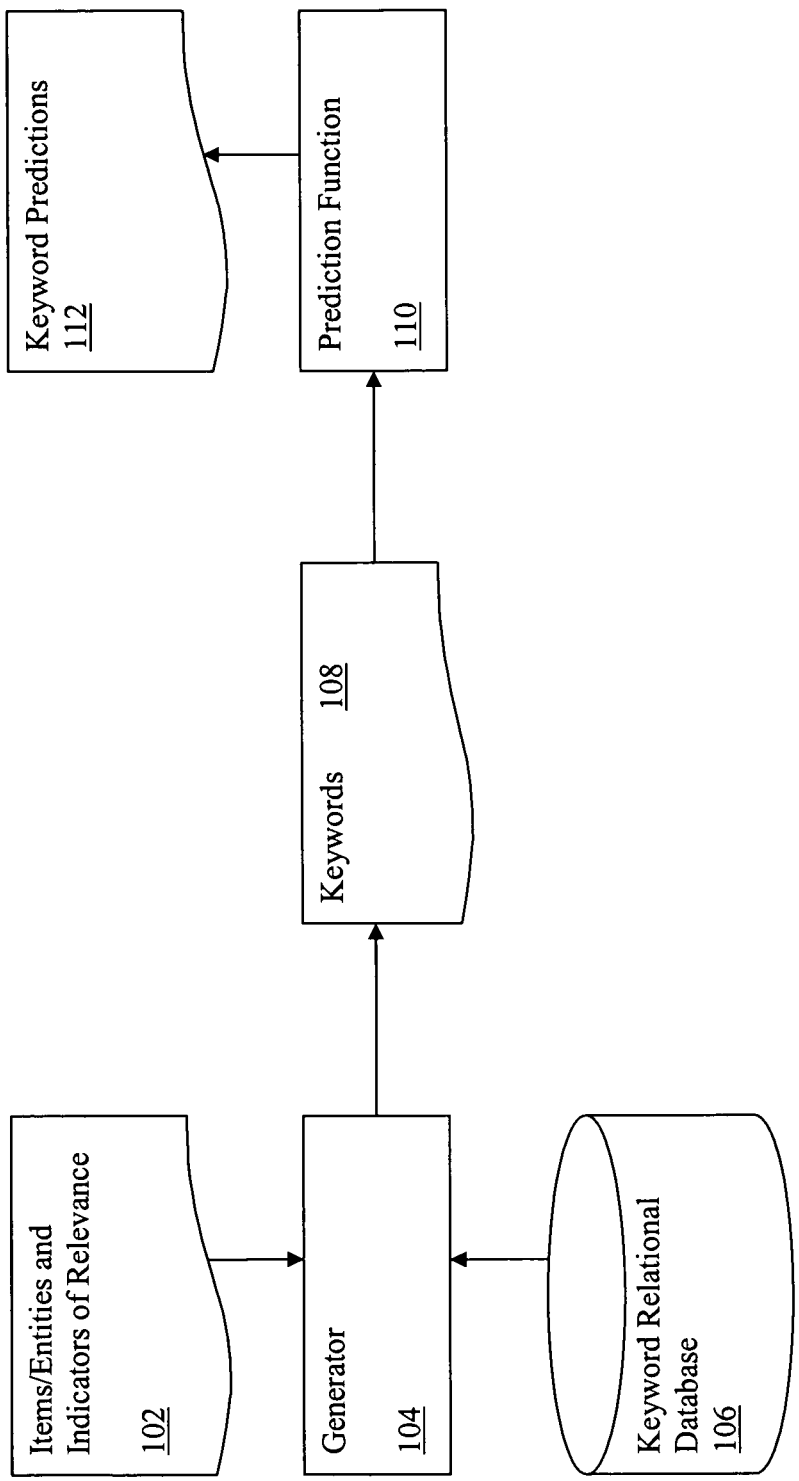
FIG. 1 illustrates an overview of the present invention, in accordance with various embodiments.

FIG. 1 illustrates an overview of the present invention, in accordance with various embodiments. As illustrated, some embodiments of the present invention include one or more items or entities of interest 102 as well as indicators of relevance or irrelevance of the one or more items/entities 102. The items/entities and indicators 102 may be entered into a generator 104, the generator capable of generating one or more advertising keyword suggestions 108, in some embodiments by retrieving keyword and item/entity relationship data from a keyword relationship database 106 and by analyzing the retrieved data. Components and data capable of performing these operations are further illustrated in FIG. 5 and are described in greater detail below. In such embodiments, the items/entities 502 may represent the items/entities 102, and the generator 504 may represent the generator 104.

Figure 2A:
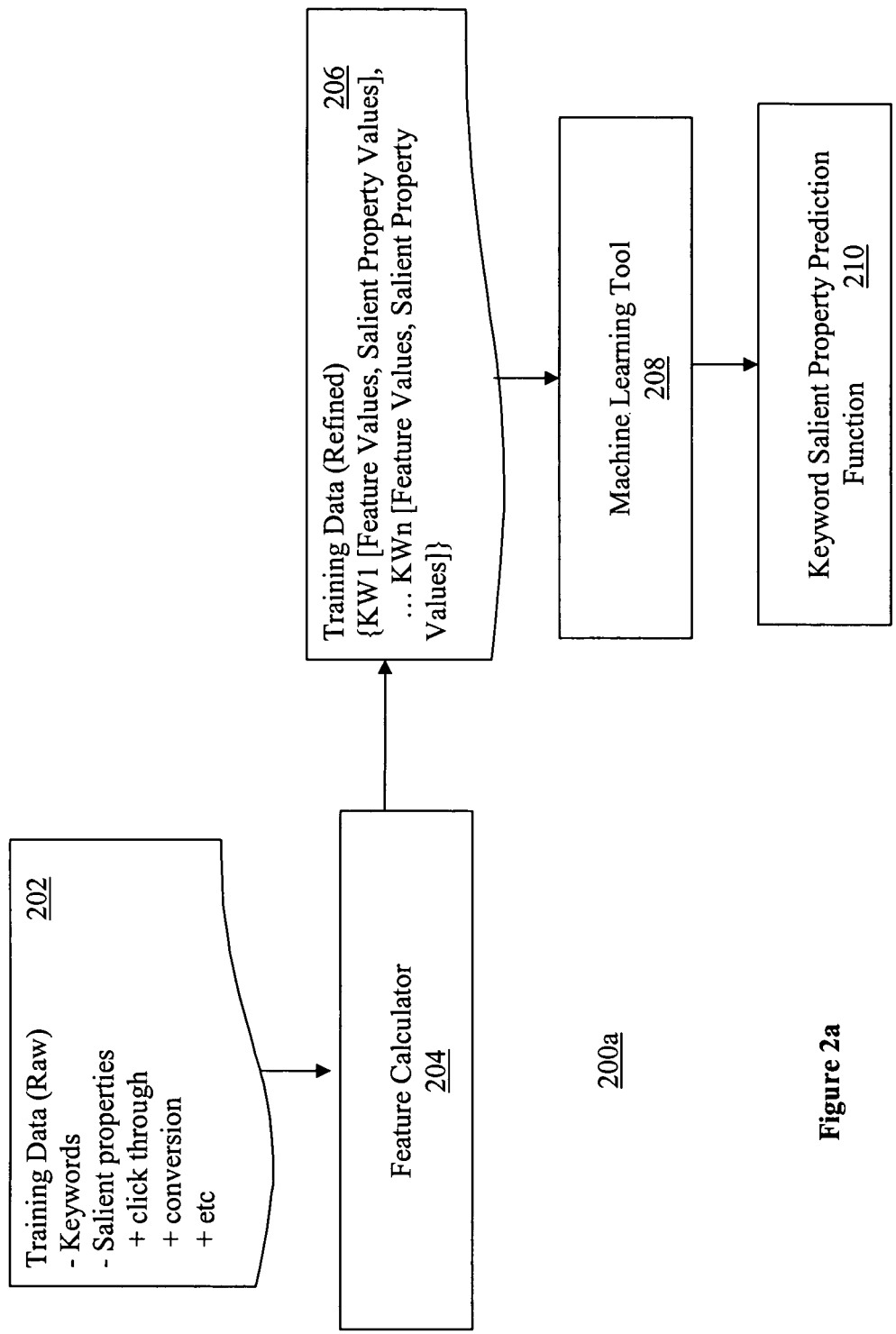
FIGS. 2a-2b illustrate an overview of the keyword effectiveness prediction aspects of the present invention, in accordance with various embodiments.
Figure 2B:
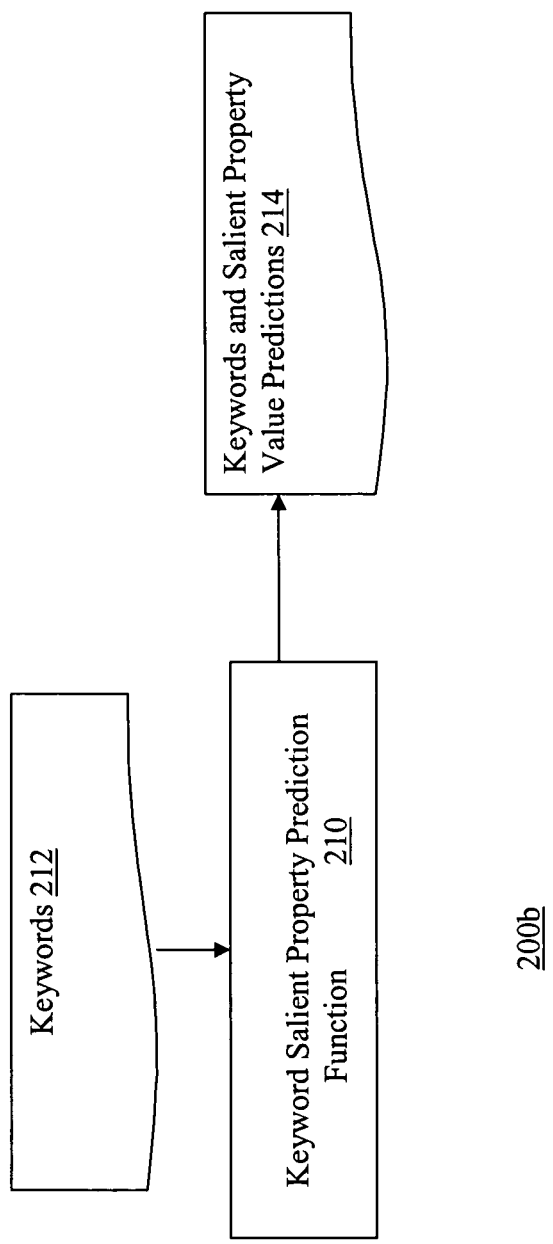

In various embodiments, such as those illustrated by FIG. 1, the results of the above described keyword generation aspects of the present invention may be further refined by keyword effectiveness prediction aspects of the present invention. As shown, once the one or more advertising keyword suggestions 108 have been generated, the keywords 108 may be received by a prediction function 110 capable of computing predictive measures 112 of advertising effectiveness metrics for each of the keywords 108. The predictive measures 112 may inform a bidding strategy. A merchant can choose which keywords to bid on, or the predictive measures 112 may be input to a system that empirically learns the true value of these keywords for a merchant. The predictive measures may also serve as input to optimization operations. The process for generating such a prediction function 110 is illustrated by FIG. 2a and is described in greater detail below, where the keyword salient property prediction function 210 may represent prediction function 110. Additionally, the use of prediction function 210 to compute predictive measures 112 is illustrated by FIG. 2b and is also described in greater detail below. In various embodiments, keyword effectiveness prediction may also be practiced for manually provided keywords.

FIGS. 2a-2b illustrate an overview of the keyword effectiveness prediction aspects of the present invention, in accordance with various embodiments.

FIG. 2a depicts data and components employed by embodiments of the present invention to generate a keyword salient property prediction function 210 ("prediction function") capable of computing predictive measures of advertising effectiveness metrics for one or more keywords 212. As illustrated, the generation of prediction function 210 involves training data 202 comprised of keywords and salient properties known about the keywords. The training data 202 may have one or more feature values generated to describe the features of its keywords by a feature calculator 204, in some embodiments. The refined collection of training data 206, comprised of keywords and their associated feature values and salient properties, may then be provided to and employed by a machine learning tool 208 to generate prediction function 210.

The data and components shown in FIG. 2a may all be located on the same computing device, or may be located on a plurality of computing devices, in some embodiments connected by a network. The computing devices may include any sort of devices known in the art, such as PCs, workstations, servers, PDAs, and mobile phones. Exemplary networks connecting computing devices may also be of any sort known in the art, including Ethernet, Bluetooth, and 802.11 networks. Such networks may also utilize any sort of communication protocol known in the art, such as TCP/IP or ATM. In one embodiment, where the data and components illustrated by FIG. 2a are located on a plurality of computing devices, but where two or more of the computing devices are not connected by a network connection, data may be written onto a storage medium by one computing device and read from the medium by another device. The storage media may be of any sort known in the art, including floppy diskettes, CDs, and thumb drives.

In various embodiments, training data 202 comprises a collection of keywords about which certain salient properties are known, such as click-through and conversion rate metrics. Such metrics may be indicative of advertising effectiveness (and thus are hereafter referred to as advertising effectiveness metrics) and may be empirically gathered for a merchant, industry, or product, in various embodiments. A keyword, such as those included in training data 202, may be bid on by a merchant, and the winning bidder or bidders may have their webpages and/or advertisements listed on the search results page for that keyword when the keyword or a related phrase incorporating the keyword is searched upon by a user of the search engine that is auctioning off the keyword. Additionally, when a search engine finds no matches for a keyword or related phrase, the search engine may look for ads keyed on related keywords that may not contain the base keyword, based, in one embodiment, on a semantic relatedness measure.

A click-through rate metric associated with the keyword may then be gathered by tracking the number of clicks a merchant's, industry's, or product's webpages and/or advertisements displayed by the search results page receive by search engine users who have searched based upon the keyword. In various embodiments, the click-through rate metric may represent the total number of clicks for a day, a month, or a year, but may be for any duration. A conversion rate metric associated with the keyword may then also be gathered by tracking the number of sales or other indicators reflective of consumption of transactions arising from the above described keyword search resultant clicks. The conversion rate, may, in some embodiments, represent the total number of sales or transactions for the same duration as the click-through rate metric, or may represent the number of sales for a different duration. Further, if additional financial information is available for a particular merchant, industry, or product, the conversion rate may be optimized for revenue, profit, cost-per-customer-acquisition, profit-per-customer, and any number of other metrics. The salient measure with respect to conversion may be an absolute number of conversions, a number of conversions per time, or some value-scaled measure of conversions per time. Also, the uncertainty in empirically estimated conversion probabilities decreases with larger sample size, so for better accuracy, keywords for which the sample size (number of clicks, number of conversions) is below some threshold may be excluded from the training data 202.

Referring again to FIG. 2a, once training data 202 has been empirically gathered, a feature calculator may generate one or more feature values for the training data. Features may comprise any attribute or aspect descriptive of the keyword or its usage. For example, a feature of a keyword may simply be one or more words found within a keyword. Thus, if the keyword is the phrase "Internet router," both router and Internet may be features of the keyword.

Features may also include an association between two or more words of a keyword. In various embodiments, it may be useful to analyze the underlying combinatorics of a keyword. That is, to find what sets of words combine with other sets of words to form keywords. For instance, the set of color words ("yellow", "blue", etc.) combines with the set of clothing words ("pants", "shirt", etc.) to form valid keywords ("yellow pants", "yellow shirt", "blue pants", etc.) but not with, for example, the names of software products ("yellow msword"?) By virtue of the likelihood of co-occurrence of classes of word meaning, in the keyword "aluminum fencing", the word "fencing" may be presumed to mean a constructed barrier, while in "Olympic fencing", it may be presumed to mean fencing-as-sport. Such sense-disambiguation may permit more effective predictions to be made.

In some embodiments, feature calculator 204 may also generate feature values for other features beyond those identified with the presence/absence of a word within a keyword. For example, the frequency with which a keyword appears in the search logs of queries issued against a corpus of relevant documents, the frequency of appearance of a keyword in a document section for a corpus of documents (where the corpus is selected, for instance, based on the relatedness of its constituents to the vertical in question), and/or a distance of a keyword from another (or a number of other) keyword(s) (where distance, in some instances, is a mathematical measure of semantic similarity), may also be considered a feature or features of the keyword. Where distance of a keyword is a feature, the various notions of distance may be measured. "Edit distance", for instance, may measure the lexical distance between strings. Thus, "trap" and "tap" would have a distance of 1. "Semantic distance", in contrast, may measure the difference in meaning between strings. Accordingly, "trap" and "tap" would not be close, but "tap" and "faucet" would be close. These examples are however by no means exhaustive of the possible features that feature calculator 204 may calculate feature values for.

Referring again to FIG. 2a, the feature values generated by feature calculator 204 for keyword features of training data 202 may, in various embodiments, be Boolean, integer, or real valued. For example, if a keyword contains a certain word, it may have a feature value of 1, and if it does not contain that word, it may have a feature value of 0. Often, a keyword of the training data 202 may be described by more than one feature, and may thus have multiple feature values generated for it by feature calculator 204, corresponding to the multiple features of the keyword. Examples of feature values, such as the integers 1 and 0 and the Booleans TRUE and FALSE are illustrated by FIG. 4 and are described in greater detail below.

Figure 8:
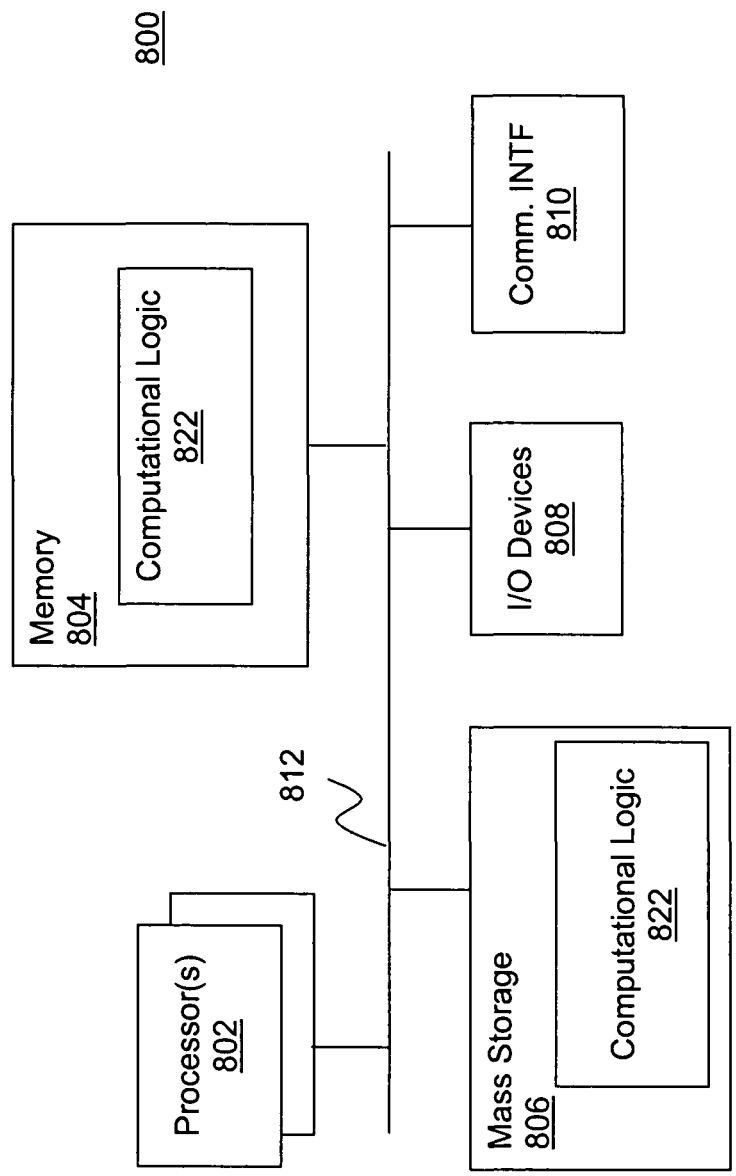
FIG. 8 is a block diagram illustrating an example computing device suitable for use to practice the keyword effectiveness prediction and/or keyword generation aspects of the present invention, in accordance with various embodiments.

In some embodiments, feature calculator 204 may be any sort of process or processes known in the art capable of analyzing training data 202 and generating feature values for the data 202 based on the analysis. The feature calculator may be implemented as an application program operated by the processor of a computer device and stored in the memory of the device (as is depicted in FIG. 8), or may have some hardware implementation, such as that of an application specific integrated circuit (hereinafter "ASIC").

As is illustrated in FIG. 2a, feature calculator 204 may then output refined training data 202 which may include the feature values generated by feature calculator 204. The refined training data 206 may consist of sets of pairs for each keyword of the training data 202/206, each pair containing the set of all feature values for that keyword and also the salient property metrics of interest for that keyword. In some embodiments, the refined training data 206 may be implemented as a table having columns for keywords, feature values, and salient property metrics, and one or more rows for each keyword. An example of such a table is illustrated by FIG. 4. The refined training data need not, however, be implemented as a table, but may have any sort of data structure known in the art.

Referring again to FIG. 2a, the machine learning tool 208, may, in some embodiments, receive the refined training data 206 as input. Upon receiving such input, the machine learning tool 208 may process the refined training data and output a prediction function 210.

There are a number of machine learning methods that may be implemented by tool 208 to generate the prediction function 210. Two such methods used in various embodiments are back-propagation methods and support vector machines. Such methods enable machine learning tool 208 to bin outputs—that is, to discretize the space of possible outputs, if an embodiment requires a discrete feature space. The binning of outputs may thereby reduce the complexity of the learning problem and permit a tool to work at a level of specificity that does not exceed the uncertainty inherent in the data. In addition to back-propagation methods and support vector machines, any other machine learning method known in the art may be implemented as machine learning tool 208. Such methods are known to those skilled in the art, and accordingly will not be described further.

In some embodiments, machine learning tool may be any sort of process or processes known in the art capable of analyzing refined training data 206 and generating a prediction function 210 based on the analysis. The machine learning tool 208 may be implemented as an application program operated by the processor of a computer device and stored in the memory of the device (as is depicted in FIG. 8), or may have some hardware implementation, such as that of an ASIC.

Referring further to FIG. 2a, the prediction function 210 generated by tool 208 may be particularized for a selected one of a merchant, an industry, or a product, in various embodiments. If the refined training data 206 is already particularized for a merchant, product, or industry, the prediction function 210 generated by the machine learning tool 208 will by nature be particularized for the merchant, product, or industry as well. In alternate embodiments, the tool 208 may be equipped with an addition filter capable of recognizing keywords in the refined training data 206 associated with a merchant, industry, or product, and then processing only those keywords and their associated feature values and salient property metrics.

As is illustrated, prediction function 210 takes a set of feature values for a received keyword (presumably not a keyword in the training data 202/206) and computes a predictive measure of advertising effectiveness for that keyword.

FIG. 2b illustrates data and components employed by embodiments of the present invention to compute a predictive measure 214 for an advertising effectiveness metric for a received keyword 212. As illustrated, the computation of the predictive measure 214 for a keyword 212 involves, in some embodiments, receiving a keyword 212 as well as receiving pre-generated feature values of the keyword 212. The keyword 212 and feature values may then be input to prediction function 210, which may then compute the predictive measure 214.

In some embodiments, the keyword 212 may represent any sort of keyword for which a merchant or group of merchants are interested in knowing one or more advertising effectiveness metrics. The keyword 212 may be one for which such advertising effectiveness metrics are not known, and thus one for which a predictive measure of such metrics may be desirable.

The keyword 212 may have had its feature values pre-generated by some other source or process, such as feature calculator 204, in various embodiments. In alternate embodiments, where the feature values are not pre-generated and thus not received along with keyword 212, the prediction function 210 or some other component or process, such as feature calculator 204, may be equipped or utilized to generate feature values for keyword 212. The process for generating feature values, as well as feature calculator 204, are described in greater detail above.

As shown, the prediction function 210 may be generated by the process described above and illustrated by FIG. 2a. In some embodiments, the prediction function 210 may compute the predictive measure for a keyword 212 by comparing feature values of the keyword 212 to feature values of keywords of training data 202/206. If the feature values are the same or similar for keyword 212 and a keyword of the training data 202/206, the salient property metric associated with the keyword of the training data 202/206 may be utilized in computing the predictive measure. In other embodiments, where the prediction function 210 has been generated by a back propagation method and/or a support vector machine, other or additional operations may be involved in computing the predictive measures 214. If multiple keywords of training data 202/206 are found the same or similar to keyword 212, their salient properties may be averaged, weighted and summed, or listed separately. For instance, if two keywords of training data 202/206 are found to have the same feature values as keyword 212, their salient property metrics, such as click-through rates for a week of one thousand clicks and four hundred clicks respectively, may be averaged, here resulting in a predictive measure of seven hundred clicks per week. The prediction function 210 is also described in detail above.

In various embodiments, the predictive measure 214 computed by prediction function 210 may be for any sort of advertising effectiveness metric known in the art, such as the salient property measures of click-through and conversion rates known for training data 202. Such click-through and conversion rates are described in greater detail above in regard to training data 202. The predictive measure 214 may be computed for a particular merchant, industry, or product. Such computing may depend on particularizing the prediction function 210 for a merchant, industry, or product. An exemplary method for particularizing the function 210 computing the predictive measure 214 is also described above. Further, prediction functions 210 of greater complexity may also be developed to compute predictive measures 214.

In various embodiments, keywords on which low bids are placed get little traffic and so little conversion data would be generated. It is possible that these keywords would convert well if they got more traffic, but there is no good way to find out—getting this information would require bidding them up (and possibly spending money for nothing.) Predictive models of keyword conversion, such as the prediction function 210, may be used to highlight keywords that merit exploratory up-bidding. Thus, the predictive model may reduce the cost of gathering empirical data.

Figure 3B:
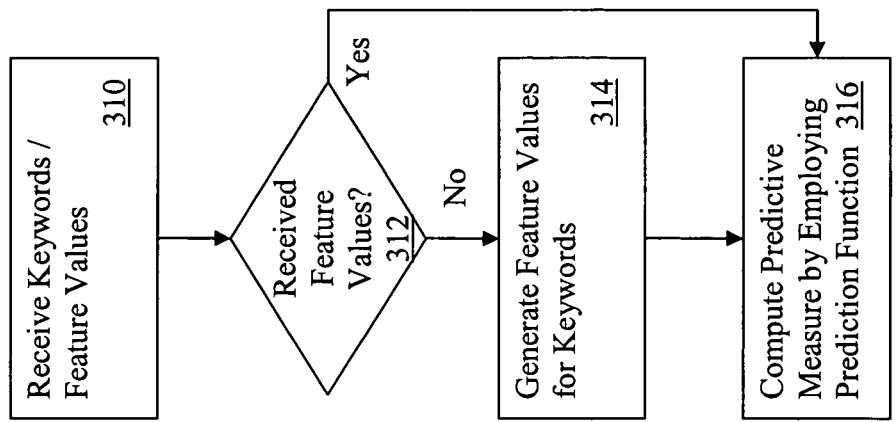
FIGS. 3a-3b illustrate flow chart views of selected operations of the keyword effectiveness prediction methods of various embodiments of the present invention.
Figure 3A:
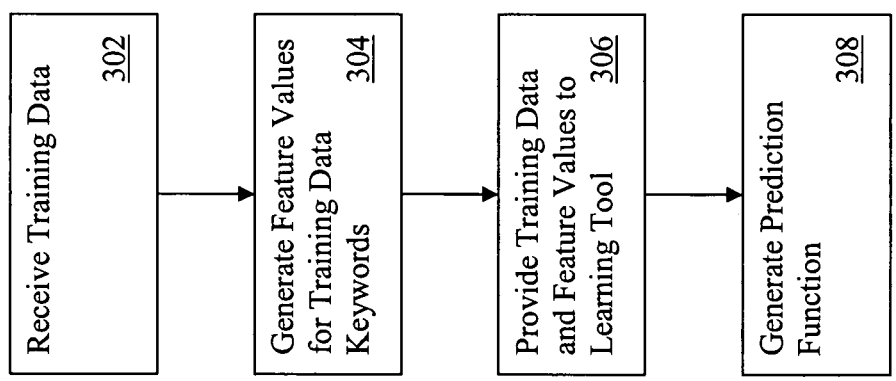

FIGS. 3a-3b illustrate flow chart views of selected operations of the keyword effectiveness prediction methods of various embodiments of the present invention.

FIG. 3a depicts selected operations of methods of embodiments of the present invention for generating a prediction function capable of computing predictive measures of advertising effectiveness metrics for one or more keywords.

In various embodiments, training data comprising a collection of keywords about which certain salient properties are known, such as click-through and conversion rate metrics, may first be received, block 302. Such metrics may be indicative of advertising effectiveness and may be empirically gathered for a merchant, industry, or product, in various embodiments. A keyword, such as those included in the training data, may be bid on by a merchant, and the winning bidder or bidders may have their webpages and/or advertisements listed on the search results page for that keyword when the keyword or a related phrase incorporating the keyword is searched upon by a user of the search engine that is auctioning off the keyword. Additionally, when a search engine finds no matches for a keyword or related phrase, the search engine may look for ads keyed on related keywords that may not contain the base keyword, based, in one embodiment, on a semantic relatedness measure.

A click-through rate metric associated with the keyword may then be gathered by tracking the number of clicks a merchant's, industry's, or product's webpages and/or advertisements displayed by the search results page receive by search engine users who have searched based upon the keyword. In various embodiments, the click-through rate metric may represent the total number of clicks for a day, a month, or a year, but may be for any duration. A conversion rate metric associated with the keyword may then also be gathered by tracking the number of sales arising from the above described keyword search resultant clicks. The conversion rate, may, in some embodiments, represent the total number of sales for the same duration as the click-through rate metric, or may represent the number of sales for a different duration. Further, if additional financial information is available for a particular merchant, industry, or product, the conversion rate may be optimized for revenue, profit, cost-per-customer-acquisition, profit-per-customer, and any number of other metrics. The salient measure with respect to conversion may be an absolute number of conversions, a number of conversions per time, or some value-scaled measure of conversions per time. Also, the uncertainty in empirically estimated conversion probabilities decreases with larger sample size, so for better accuracy, keywords for which the sample size (number of clicks, number of conversions) is below some threshold may be excluded from the training data.

Referring further to FIG. 3a, once the training data has been received, a feature calculator may generate one or more feature values for the training data, block 304. Features may comprise any attribute or aspect descriptive of the keyword or its usage. For example, a feature of a keyword may simply be one or more words found within a keyword. Thus, if the keyword is the phrase "Internet router," both router and Internet may be features of the keyword.

Features may also include an association between two or more words of a keyword. In various embodiments, it may be useful to analyze the underlying combinatorics of a keyword. That is, to find what sets of words combine with other sets of words to form keywords. For instance, the set of color words ("yellow", "blue", etc.) combines with the set of clothing words ("pants", "shirt", etc.) to form valid keywords ("yellow pants", "yellow shirt", "blue pants", etc.) but not with, for example, the names of software products ("yellow msword"?) By virtue of the likelihood of co-occurrence of classes of word meaning, in the keyword "aluminum fencing", the word "fencing" may be presumed to mean a constructed barrier, while in "Olympic fencing", it may be presumed to mean fencing-as-sport. Such sense-disambiguation may permit more effective predictions to be made.

In some embodiments, features of the keywords of the training data may also include features beyond the presence/absence of a word within a keyword. For example, the frequency with which a keyword appears in the search logs of queries issued against a corpus of relevant documents, the frequency of appearance of a keyword in a document section for a corpus of documents (where the corpus is selected, for instance, based on the relatedness of its constituents to the vertical in question), and/or a distance of a keyword from another (or a number of other) keyword(s) (where distance, in some instances, is a mathematical measure of semantic similarity), may also be considered a feature or features of the keyword. Where distance of a keyword is a feature, the various notions of distance may be measured. "Edit distance", for instance, may measure the lexical distance between strings. Thus, "trap" and "tap" would have a distance of 1. "Semantic distance", in contrast, may measure the difference in meaning between strings. Accordingly, "trap" and "tap" would not be close, but "tap" and "faucet" would be close. These examples are however by no means exhaustive of the possible features that a keyword may have.

The feature values generated for keyword features of the training data may, in various embodiments, be Boolean, integer, or real valued. For example, if a keyword contains a certain word, it may have a feature value of 1, and if it does not contain that word, it may have a feature value of 0. Often, a keyword may be described by more than one feature, and may thus have multiple feature values generated for it, corresponding to the multiple features of the keyword.

As is illustrated in FIG. 3a, refined training data, which includes the feature values generated above, may next be provided to a machine learning tool, block 306. The refined training data may consist of sets of pairs for each keyword of the training data, each pair containing the set of all feature values for that keyword and also the salient property metrics of interest for that keyword. In some embodiments, the refined training data may be implemented as a table having columns for keywords, feature values, and salient property metrics, and one or more rows for each keyword. The refined training data need not, however, be implemented as a table, but may have any sort of data structure known in the art.

As illustrated, upon receiving the training data and feature values in the form of the refined training data, the machine learning tool may process the refined training data and generate a prediction function, block 308. There are a number of machine learning methods that may be implemented by the machine learning tool to generate a prediction function. Two such methods used in various embodiments are back-propagation methods and support vector machines. Such methods enable the machine learning tool to bin outputs—that is, to discretize the space of possible outputs, if an embodiment requires a discrete feature space. The binning of outputs may thereby reduce the complexity of the learning problem and permit a tool to work at a level of specificity that does not exceed the uncertainty inherent in the data. In addition to back-propagation methods and support vector machines, any other machine learning method known in the art may be implemented as the machine learning tool. Such methods are well known to those skilled in the art, and accordingly will not be described further.

In some embodiments, the prediction function generated by the machine learning tool may be particularized for a selected one of a merchant, an industry, or a product, in various embodiments. If the refined training data is already particularized for a merchant, product, or industry, the prediction function generated by the machine learning tool will by nature be particularized for the merchant, product, or industry as well. In alternate embodiments, the machine learning tool may be equipped with an additional filter capable of recognizing keywords in the refined training data associated with a merchant, industry, or product, and then processing only those keywords and their associated feature values and salient property metrics.

FIG. 3b illustrates selected operations of methods of embodiments of the present invention for computing a predictive measure for an advertising effectiveness metric for a received keyword.

In various embodiments, a keyword and one or more feature values of one or more features of the keyword may first be received, block 310. The received keyword may represent any sort of keyword for which a merchant or group of merchants are interested in knowing one or more advertising effectiveness metrics. Also, the keyword may be one for which such advertising effectiveness metrics are not known, and thus one for which a predictive measure of such metrics may be desirable.

Upon receiving the keyword, block 310, methods of an embodiment may then determine if feature values have also been received with the keyword, block 312. The keyword may have had its feature values pre-generated by some other source or process, such as a feature calculator, in various embodiments. In alternate embodiments, where the feature values are not pre-generated and thus not received along with the keyword, methods of an embodiment of the present invention may then generate feature values for the keyword, block 314. The process for generating feature values for keywords is described in greater detail above.

As shown, methods of an embodiment of the present invention may then compute a predictive measure for a keyword by employing the prediction function such as the function generated by the selected operation illustrated in FIG. 3a and described above, block 316. In some embodiments, the predictive measure may be computed by comparing feature values of the received keyword to feature values of keywords of the training data. If the feature values are the same or similar for the received keyword and a keyword of the training data, the salient property metric associated with the keyword of the training data may be utilized in computing the predictive measure. In other embodiments, where the prediction function has been generated by a back propagation method and/or a support vector machine, other or additional operations may be involved in computing the predictive measure. If multiple keywords of the training data are found to be the same as or similar to the received keyword, their salient properties may be averaged, weighted and summed, or listed separately.

In various embodiments, the predictive measure computed by the prediction function may be for any sort of advertising effectiveness metric known in the art, such as the salient property measures of click-through and conversion rates known for the training data. Such click-through and conversion rates are described in greater detail above in regard to the training data. The predictive measure may be computed for a particular merchant, industry, or product. Such computing may depend on particularizing the prediction function for a merchant, industry, or product. An exemplary method for particularizing the prediction function computing the predictive measure is also described above.

FIG. 4 illustrates an exemplary table for storing refined training data utilized by various components of embodiments of the present invention. The table contains a plurality of keywords, a feature value associated with each feature of a keyword, and a salient property value metric associated with each keyword. The keywords, feature values, and salient property value metrics illustrated by the table, as well as the process for generating the refined training data 206 illustrated by the table of FIG. 4, are all described in greater detail above in reference to FIGS. 2a-2b.

Figure 5:
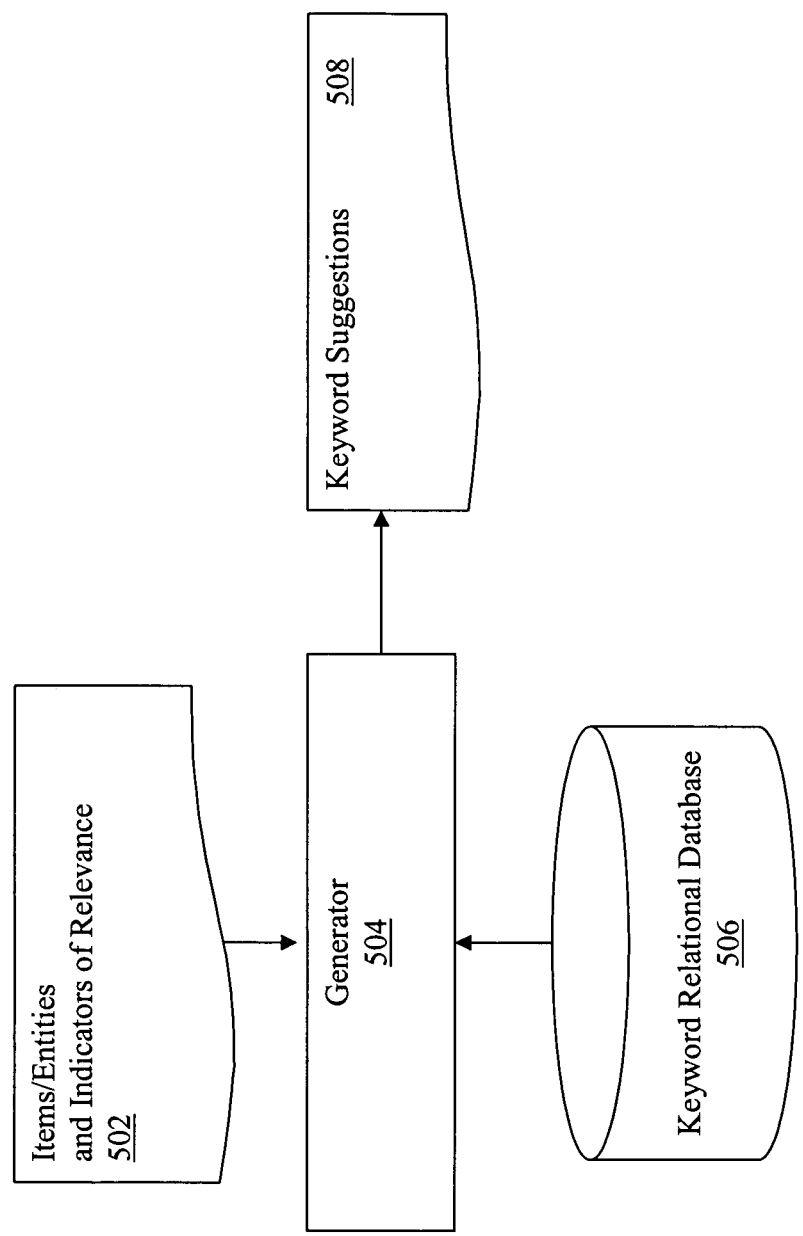
FIG. 5 illustrates an overview of the keyword generation aspects of the present invention, in accordance with various embodiments.

FIG. 5 illustrates an overview of the keyword generation aspects of the present invention, in accordance with various embodiments. As illustrated, a user may provide one or more items or entities 502 of interest regarding advertising keywords as well as indicators of relevance or irrelevance of the items or entities 502. Such items/entities 502 may be received by a generator 504 capable of generating one or more advertising keyword suggestions 508 based on the relationships of the received items/entities to various keywords, those keyword and item/entity relationships stored, in some embodiments, in a keyword relationship database 506.

The data and components shown in FIG. 5 may all be located on the same computing device, or may be located on a plurality of computing devices, in some embodiments connected by a network. The computing devices may include any sort of devices known in the art, such as PCs, workstations, servers, PDAs, and mobile phones. Exemplary networks connecting computing devices may also be of any sort known in the art, including Ethernet, Bluetooth, and 802.11 networks. Such networks may also utilize any sort of communication protocol known in the art, such as TCP/IP or ATM. In one embodiment, where the data and components illustrated by FIG. 5 are located on a plurality of computing devices, but where two or more of the computing devices are not connected by a network connection, data may be written onto a storage medium by one computing device and read from the medium by another device. The storage media may be of any sort known in the art, including floppy diskettes, CDs, and thumb drives. In various embodiments, some or all of the data and components shown in FIG. 5 may be located on the same computer system as some or all of the data and components shown in FIG. 2.

Referring again to FIG. 5, items or entities 502 may be any sort of criteria useful to identify keywords of interest, such as keywords, words, websites, merchants (i.e., merchants in the same space), and categories in an ontology. Additionally, the items or entities 502 may include weighted Boolean indicators of relevance and/or irrelevance. In some embodiments, the degree of relevance or irrelevance is selected by a user. In various embodiments, irrelevant keywords, words, merchants, etc, may be assigned negative weights to reflect their irrelevancy. In various embodiments, relevant and irrelevant keywords may be learned from a variety of sources, including but not limited to search engines, such as Google, or Overture.

In still other embodiments, items or entities 502 may be characterized based on other criteria, such as regular expressions like "home (re)?financ.*," to characterize keywords like "home finances" and "home refinancing". In still other embodiments, items or entities 502 may include context-free grammars.

In some embodiments, items or entities 502 and their indicators of relevance and/or irrelevance may be input into a generator 504 adapted to receive as input items or entities 502, as well as indicators of relevance and/or irrelevance. The possible indicators of relevance and/or irrelevance and weights may be presented to users in a drop down list, from which a user may select the indicator and weight to accompany the item or entity 502. In alternate embodiments, the list or some other type of user interface element may allow a user to select whether an item or entity is relevant or irrelevant, and the generator 504 (described below) may assign the item or entity a weight based on an operation. For example, different query types may be assigned fixed, preset weights. Further, in one embodiment, a user may enter the name of the keyword, word, merchant, etc. in a user interface element, and may select an item or entity type, such as "keyword" or "merchant" to correspond to the entered name. In alternate embodiments, the user may enter both the name and the type of the item or entity 502.

As is shown, generator 504 may be a keyword search engine capable of generating advertising keyword suggestions 508. Such a keyword search engine 504 may be different from an Internet search engine such as Google or Overture. In some embodiments, a user may enter items or entities 502 and indicators of relevance and/or irrelevance into a user interface of generator 504.

In various embodiments, generator 504 may be any sort of application software or application specific integrated circuit (ASIC) known in the art capable of receiving items or entities 504, retrieving keywords from a database 506 of keyword relationships, performing a spreading activation analysis on a graph constructed from the retrieved keywords, and generating advertising keyword suggestions 508 based on the analysis.

As is further illustrated, keyword relational database 506 may be any sort of relational database known in the art. Database 506 may contain tables of keywords, tables of merchants, tables of other items or entities 502, or some combination of two or more of those sorts of tables. Additionally, the relationships between the tables of database 506 may be achieved through the use of keywords and/or items or entities 502 as keys that are present in two or more of the tables. For example, database 506 may comprises a plurality of tables of merchants. Each merchant table may contain at least one or more keywords that have been bid upon by the merchant, as well as the number of times each of the contained keywords have been bid upon. In some embodiments, the keywords bid upon by each merchant may serve as keys connecting the merchant tables of database 506.

In various embodiments, the keyword and item or entity pairs stored in database 506 may be gathered from any number of sources. The keywords and the items or entities related to the keywords may be gathered via some web monitoring process, such as a process that monitors which keywords a group of merchants bids upon, or a process that identifies which keywords are associated with a group of webpages. Such a process may be performed prior to the operations of embodiments of the present invention, or concurrently with those operations. Upon gathering the monitoring data, a process or a user may store the gathered keyword and item or entity 502 pairs in keyword relational database 506 by creating a plurality of tables and storing the gathered data in the tables. Methods for creating tables and storing data in tables are well known in the art.

As is further shown, generator 504 may retrieve all or a subset of the data stored in the database 506. The generator 504 may retrieve the data through the use of a query, and may use items or entities 502 as parameters of the query, thus retrieving only relevant results. The retrieved data may comprise all or a portion of the tables retrieved. In various embodiments, spreading activation analysis may then be applied to the retrieved data by generator 504 to determine which advertising keywords to suggest.

Figure 7A:
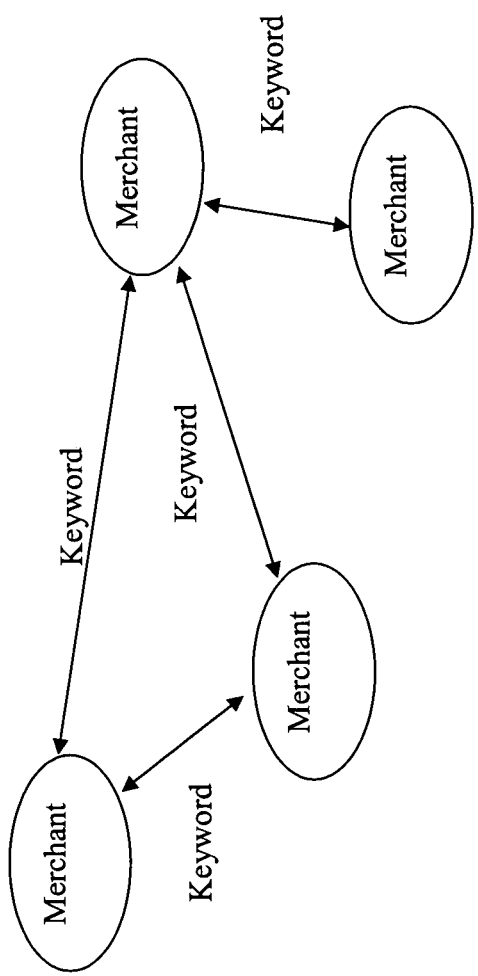
FIGS. 7a-7b are depictions of graphical representations of relationships between keywords and items or entities, in accordance with various embodiments.
Figure 7B:
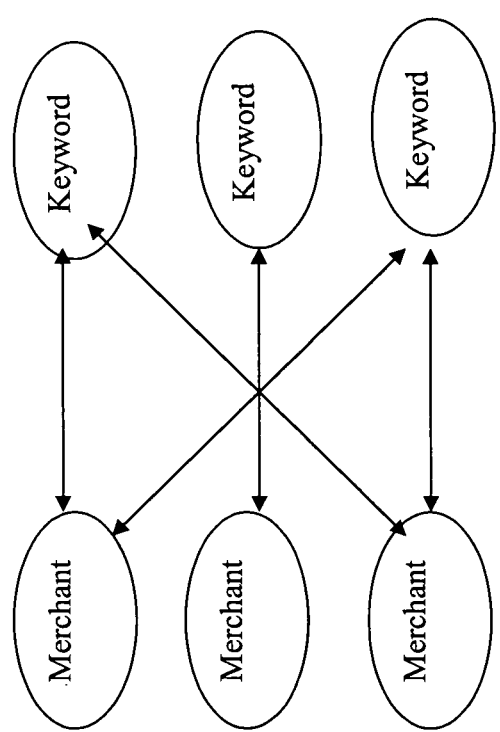

In some embodiments, spreading activation analysis may comprise generator 504 first generating a data structure for a graph having nodes and segments connecting the nodes, with at least one of the retrieved keywords and/or items or entities 502 occupying the nodes or the segments. There are many ways to construct such a graph. For example, merchant entities 502 may be represented in the graph as nodes, and keywords that merchants 502 have bid upon may be represented as edges, with a keyword/edge connecting two merchants/nodes 502 if both merchants have bid on that keyword. In other embodiments, the graph may be constructed with bid upon keywords represented as nodes and merchant entities 502 represented as edges, with a merchant/edge 502 connecting two keyword/nodes if both keywords have been bid upon by that merchant 502. In yet other embodiments, the graph generated may be a bipartite graph in which one set of nodes may represent merchant entities 502 and another may represent keywords. Edges may then connect a merchant 502 node and a keyword node if the merchant 502 has bid on that keyword. Examples of such graphs are illustrated by FIGS. 7a-7b and are discussed in further detail below.

Referring again to FIG. 5, generator 504 may generate a data structure implementing any one of the above described graph arrangements, or some other arrangement, by any method known in the art. For example, generator 504 may create a C++ class to represent the graph, the graph class containing node child classes or data structures, the child class or structure containing a variable representing the edge, the variable comprising a pointer to another node child class or structure. Any given child class or structure node may contain a plurality of variables representing a plurality of edges. Further, each child class/structure representing a node may contain a variable indicating a degree of activation of that node. Upon constructing such a graph, generator 504 may assign the retrieved data to its intended locations within the graph. For example, if the database 506 contained a plurality of merchant tables, each node may be assigned to a retrieved merchant, and each edge variable may represent a keyword that the merchant whose node has the variable has bid upon. The edge variable may represent a pointer to a node of another bidding merchant. Thus, the retrieved data may be represented by a graph generated by generator 504.

In various embodiments, one or more of the nodes of the generated graph may be assigned a degree of activation based upon the indicators of relevance and/or irrelevance. The activation may be a positive or negative integer, with a positive integer indicating relevance, and a negative integer indicating irrelevance. In embodiments where such indicators are weighted, an extremely relevant indicator may be associated with a greater integer, such as '5', and a somewhat relevant indicator may be associated with a lesser integer, such as '2.' For example, if two of the entities 502 are merchants that have bid upon a keyword, and one has been designated with a relevance indicator of '5' and another with a irrelevance indicator of '−2,' a node associated with the first may be assigned an activation of '5,' and a node associated with the second may be assigned an activation of '−2.'

Further, the assigned activation may then be iteratively propagated away from each node having an assigned activation to all of the nodes to which it is connected, until a finishing criterion has been met. For example, a convergence threshold might be reached, or a certain number of iterations may have taken place. Thus, if a node is initially assigned some activation, some fixed fraction of its activation may be evenly divided up between all of the related nodes. Each of these may then have its activation decreased, and further additional nodes that are connected will each then received some degree of activation. When a convergence threshold, such as a number of propagation cycles having passed, has been reached, the iterative propagation of activation may stop.

In some embodiments, once a convergence threshold has been reached or some maximum number of iterations has occurred, generator 504 may then determine which nodes are activated. If the activated nodes represent items or entities 502, each keyword associated with an activated node (perhaps represented by an edge) may then be generated as an advertising keyword suggestion 508. In other embodiments, if the activated nodes represent keywords, the keywords associated with the activated nodes may then be generated by generator 504 as advertising keyword suggestions.

In various embodiments, the advertising keyword suggestions 508 comprise a non-final set of keywords, and are subject to filtering or constraining based on one or more criteria. An exemplary criterion may be the predictive measures of advertising effectiveness generated for keywords described above and illustrated by FIG. 2. Filtering based upon such predictive measures is further illustrated above by FIG. 1. In such embodiments, advertising keyword suggestions 508 serve as input to a prediction function 110/210, which may compute a predictive measure of each of the advertising keyword suggestion. Upon computing the predictive measure, only those keywords meeting a certain threshold predictive measure may comprise a final set of advertising keyword suggestions.

Figure 6:
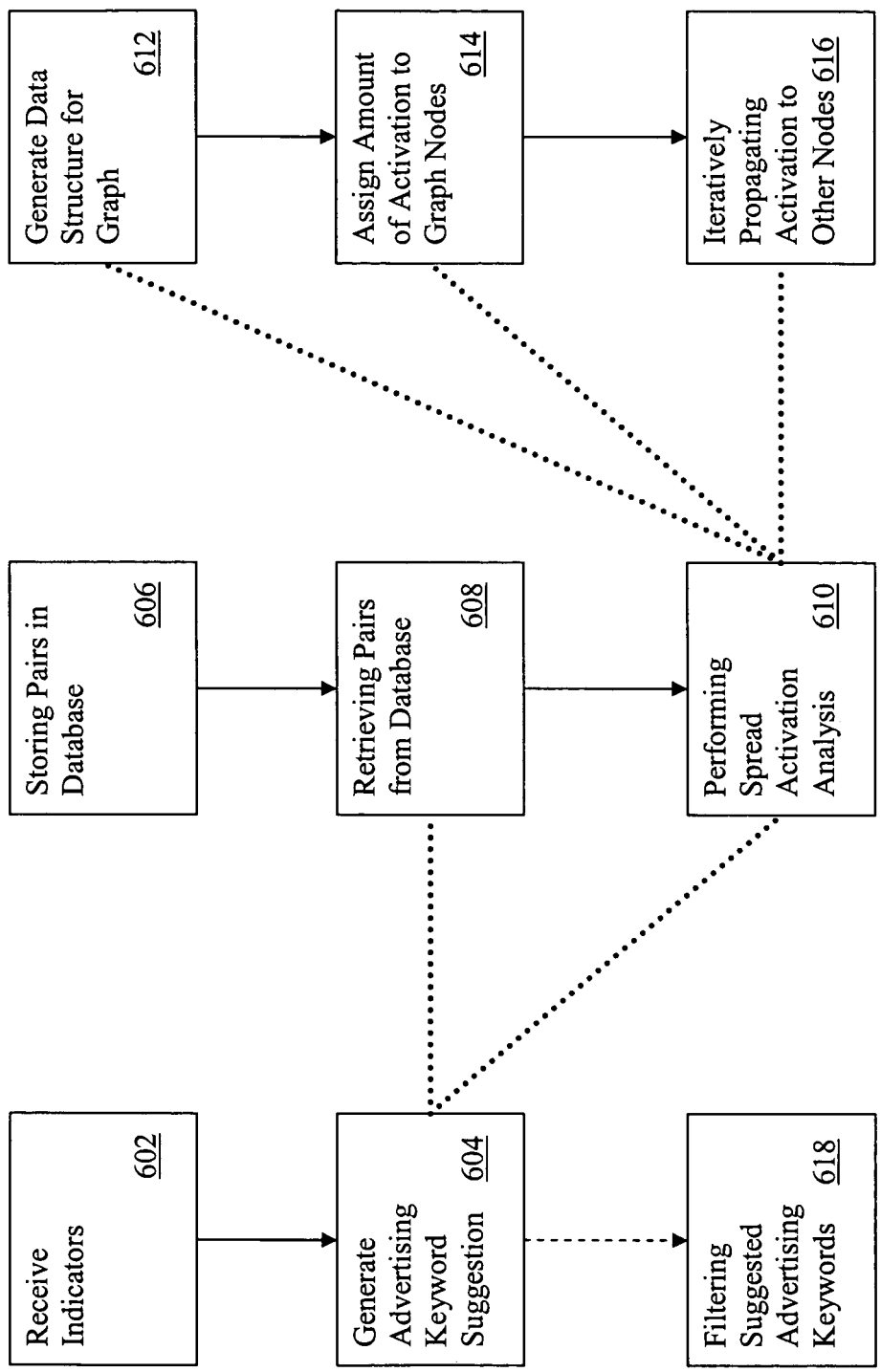
FIG. 6 illustrates a flow chart view of selected operations of the keyword generation methods of various embodiments of the present invention.

FIG. 6 illustrates a flow chart view of selected operations of the keyword generation methods of various embodiments of the present invention. As illustrated, keyword generation methods may first comprise receiving items or entities and indicators of relevance and/or irrelevance of each of the items or entities, block 602. The items or entities may be any sort of criteria useful to identify keywords of interest, such as keywords, words, websites, merchants (i.e., merchants in the same space), and categories in an ontology. Additionally, the items or entities may include weighted Boolean indicators of relevance and/or irrelevance. In some embodiments, the degree of relevance or irrelevance may be selected by a user. Irrelevant keywords, words, merchants, etc, may be assigned negative weights to reflect their irrelevancy. In various embodiments, the relevant and irrelevant keywords may be learned from a variety of sources, including but not limited to search engines, such as Google, or Overture.

In still other embodiments, items or entities may be characterized based on other criteria, such as regular expressions like "home (re)?financ.*," to characterize strings like "home finances" and "home refinancing". Additionally, items or entities may include context-free grammars.

In some embodiments, the items or entities and their indicators of relevance and/or irrelevance may be received via a generator adapted to receive items or entities as well as indicators of relevance and/or irrelevance, block 602. The possible indicators of relevance and/or irrelevance and weights may be presented to users in a drop down list, from which a user may select the indicator and weight to accompany the item or entity. In alternate embodiments, the list or some other type of user interface element may allow a user to select whether an item or entity is relevant and/or irrelevant, and a weight may be assigned to an item or entity based on an operation. For example, different query types may be assigned fixed, preset weights. Further, in one embodiment, a user may enter the name of the keyword, word, merchant, etc. in a user interface element, and may select an item or entity type, such as "keyword" or "merchant" to correspond to the entered name. In alternate embodiments, the user may enter both the name and the type of the item or entity.

As is further illustrated, prior to generating advertising keyword suggestions, block 604, keyword generation methods may store pairs of keywords and related items of entities in a database, block 606. The database may be any sort of database known in the art. The database may contain tables of keywords, tables of merchants, tables of other items or entities, or some combination of one or more of those sorts of tables. Additionally, the relationships between the tables of database may be achieved through the use of keywords and/or items or entities as keys that are present in two or more of the tables. For example, database may comprise a plurality of tables of merchants. Each merchant table may contain at least one or more keywords that have been bid upon by the merchant, as well as the number of times each of the contained keywords has been bid upon. In some embodiments, the keywords bid upon by each merchant may serves as keys connecting the merchant tables of database.

In some embodiments, the keyword and item or entity pairs stored in the database, block 606, may be gathered from any number of sources. The keywords and the items or entities related to the keywords may be gathered via some web monitoring process, such as a process that monitors which keywords a group of merchants have bid upon, or a process that identifies which keywords are associated with a group of webpages. Such a process may be performed prior to the operations of the keyword generation methods, or concurrently with those operations. Upon gathering the monitoring data (not shown), a process or a user may store the gathered keyword and item or entity pairs in a database, block 606, by creating a plurality of tables and storing the gathered data in the tables. Methods for creating tables and storing data in tables are well known in the art.

As is further shown, the keyword generation method for generating advertising keyword suggestions, block 604 may comprise the operations of retrieving keyword and item or entity pairs from the database, block 608, and performing spreading activation analysis on the retrieved pairs, block 610. Retrieval operations, block 608, may involve retrieving all or a subset of the data stored in the database. The data may be retrieved through the use of a query, and may use items or entities as parameters of the query, thus retrieving only relevant results.

In various embodiments, keyword generation methods may then perform spreading activation analysis to determine which advertising keywords to suggest, block 610. As shown, spreading activation analysis may comprise the operations of generating a data structure for a graph to represent the retrieved pairs, block 612, assigning an amount of activation to node of the graph, block 614, and iteratively propagating the activation to other graph nodes, block 616.

In some embodiments, a data structure for a graph having nodes and segments connecting the nodes, with at least one of the retrieved keywords and/or items or entities occupying the nodes or the segments may then be generated, block 612. There are many ways to construct such a graph. For example, merchant entities may be represented in the graph as nodes, and keywords that merchants have bid upon may be represented as edges, with a keyword/edge connecting two merchants/nodes if both merchants have bid on that keyword. In other embodiments, the graph may be constructed with bid upon keywords represented as nodes and merchant entities represented as edges, with a merchant/edge connecting two keyword/nodes if both keywords have been bid upon by that merchant. In yet other embodiments, the graph generated may be a bipartite graph in which one set of nodes may represent merchant entities and another may represent keywords. Edges may then connect a merchant node and a keyword node if the merchant has bid on that keyword.

The data structure implementing any one of the above described graph arrangements, or some other arrangement, may be generated by any method known in the art, block 612. For example, the graph may be represented by a C++ class, the graph class containing node child classes or data structures, the child class or structure containing a variable representing the edge, the variable comprising a pointer to another node child class or structure. Any given child class or structure node may contain a plurality of variables representing a plurality of edges. Further, each child class/structure representing a node may contain a variable indicating a degree of activation of that node. Upon constructing such a graph, the retrieved data may be assigned to its intended locations within the graph. For example, if the database contained a plurality of merchant tables, each node may be assigned to a retrieved merchant, and each edge variable may represent a keyword that the merchant whose node has the variable has bid upon. The edge variable may represent a pointer to a node of a second bidding merchant.

As illustrated, one or more of the nodes of the generated graph may be assigned a degree of activation based upon the indicators of relevance and/or irrelevance, block 614. The activation may be a positive or negative integer, with a positive integer indicating relevance, and a negative integer indicating irrelevance. In embodiments where such indicators are weighted, an extremely relevant indicator may be associated with a greater integer, such as '5', and a somewhat relevant indicator may be associated with a lesser integer, such as '2.' For example, if two of the items or entities are merchants that have bid upon a keyword, and one has been designated with a relevance indicator of '5' and another with a irrelevance indicator of '−2,' a node associated with the first may be assigned an activation of '5,' and a node associated with the second may be assigned an activation of '−2.'

Further, the assigned activation may then be iteratively propagated away from each node having an assigned activation to all of the nodes to which it is connected, until a finishing criterion has been met, block 616. For example, a convergence threshold might be reached, or a certain number of iterations may have taken place. Thus, if a node is initially assigned some activation, some fixed fraction of its activation may be evenly divided up between all of the related nodes. Each of these may then have its activation decreased, and further additional nodes that are connected will each then received some degree of activation. When a convergence threshold, such as a number of propagation cycles having passed, has been reached, the iterative propagation of activation may cease.

As illustrated, once a convergence threshold has been reached or some maximum number of iterations has occurred, advertising keyword suggestions corresponding to some or all of the activated nodes or edges of such nodes may then be generated, block 604. If the activated nodes represent items or entities, each keyword associated with an activated node (perhaps represented by an edge) may then be generated as an advertising keyword suggestion. In other embodiments, if the activated nodes represent keywords, the keywords associated with the activated nodes may then be generated as advertising keyword suggestions.

In various embodiments, the advertising keyword suggestions comprise a non-final set of keywords, and are subject to filtering or constraining based on one or more criteria, block 618 (shown as an optional operation). An exemplary criterion may be the predictive measures of advertising effectiveness generated for keywords described above and illustrated by FIG. 2. Filtering based upon such predictive measures is further illustrated above by FIG. 1. In such embodiments, the advertising keyword suggestions serve as input to a prediction function, which may compute a predictive measure of each of the advertising keyword suggestion. Upon computing the predictive measure, only those keywords meeting a certain threshold predictive measure may comprise a final set of advertising keyword suggestions.

FIGS. 7a-7b are depictions of graphical representations of relationships between keywords and items or entities, in accordance with various embodiments. As illustrated, generator 504 may generate a data structure comprising a graphical representation ("graph") that includes nodes and edges. In such a graph, the nodes may represent items or entities, such as merchants of interest, and the edges may represent keywords common to the items or entities. Such an embodiment is illustrated by FIG. 7a. Thus, as shown, two merchants who have both bid on the same keyword would be connected by an edge representing that keyword. In other embodiments, not shown, the keywords may represent nodes, and items or entities may represent edges connecting the keyword nodes. In yet other embodiments, both keywords and items or entities may be represented by nodes, and an edge may connect a keyword node and an item/entity node if some relationship exists between the keyword and the item/entity. FIG. 7b illustrates such embodiments, where merchant (entity) and keyword nodes are connected by an edge if the merchant represented by the merchant node has bid on the keyword represented by the keyword node. Such graphs as those illustrated by FIGS. 7a-7b may facilitate spreading activation analysis, the manner in which such analysis is facilitated described in greater detail above in reference to FIG. 5.

FIG. 8 is a block diagram illustrating an example computing device suitable for use to practice the keyword effectiveness prediction and/or keyword generation aspects of the present invention, in accordance with various embodiments. As shown, computing system/device 800 includes one or more processors 802, and system memory 804. Additionally, computing system/device 800 includes mass storage devices 806 (such as diskette, hard drive, CDROM and so forth), input/output devices 808 (such as keyboard, cursor control and so forth) and communication interfaces 810 (such as network interface cards, modems and so forth). The elements are coupled to each other via system bus 812, which represents one or more buses. In the case of multiple buses, they are bridged by one or more bus bridges (not shown).

Each of these elements performs its conventional functions known in the art. In particular, system memory 804 and mass storage 806 may be employed to store a working copy and a permanent copy of the programming instructions implementing the keyword effectiveness prediction and/or keyword generation aspects of the above described teachings to practice the present invention, here shown as computational logic 822. The programming instructions may be implemented as assembler instructions supported by processor(s) 802 or high level languages, such as C, that can be compiled into such instructions.

The permanent copy of the programming instructions may be placed into permanent storage 806 in the factory, or in the field, through e.g. a distribution medium (not shown) or through communication interface 810 (from a distribution server (not shown)).

The constitution of these elements 802-812 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. Those with skill in the art will readily appreciate that the present invention may be implemented in a very wide variety of embodiments or extended there from. For example, in various embodiments, the system may also be extended to provide confidence metrics for the predictions. This application is intended to cover any adaptations or variations of the embodiments discussed herein. Therefore, it is manifestly intended that this invention be limited only by the claims and the equivalents thereof.

What is claimed is:

1. A method comprising:
receiving, by a keyword generator from a marketer device of a marketer, input identifying items of interest to the marketer and a respective relevance value for each of the items of interest, wherein the keyword generator is configured to automatically provide keyword suggestions to the marketer device and to a bidding system in response to the input;
accessing, by the keyword generator from a data store, historical information about items and about bids for keywords in association with the items, the items comprising the items of interest;
generating, by the keyword generator, a data structure having nodes and segments connecting the nodes based upon the historical information, wherein the nodes represent the items and the segments represent the keywords, and wherein a node representing an item is connected to a segment representing a keyword based upon a bid for the keyword in association with the item;
assigning, by the keyword generator and based upon the respective relevance value for each of the items of interest, degrees of activation to nodes of the data structure corresponding to the items of interest, wherein a degree of activation assigned to a node indicates a relevance of a keyword to a corresponding item of interest;
assigning, by the keyword generator, additional degrees of activation to additional nodes of the data structure by propagating the assigned degrees of activation away from each node having an assigned degree of activation until a finishing criterion has been met;
identifying, by the keyword generator, the keyword suggestions for the items of interest based upon the degrees of activation assigned to the nodes and the additional degrees of activation assigned to the additional nodes; and
providing, by the keyword generator, the keyword suggestions to an advertiser device and to the bidding system, the providing causing a bid from the advertiser device at the bidding system based upon predictive measures from the bidding system for the keyword suggestions.

2. The method of claim 1, wherein receiving the input identifying the items of interest and the respective relevance value for each of the items of interest comprises:
   receiving names of merchant entities as the items of interest; and
   receiving relevance values for each of the merchant entities.

3. The method of claim 2, wherein the merchant entities are represented in the data structure as the nodes and the keywords that the merchant entities have bid upon are represented as the segments, wherein a segment for a keyword connects nodes of two merchant entities to represent that both of the two merchant entities have bid on the keyword.

4. The method of claim 1, wherein at least one relevance value for an item is negative to indicate irrelevance of the item.

5. The method of claim 1, wherein the finishing criterion comprises a convergence threshold having been met.

6. The method of claim 1, wherein the finishing criterion comprises a number of iterations having been performed.

7. The method of claim 1, wherein identifying the keyword suggestions further comprises determining a non-final set of one or more advertising keywords, and filtering or constraining the non-final set to generate a final set of one or more advertising keywords.

8. The method of claim 7, wherein said filtering or constraining of the non-final set to generate the final set of one or more advertising keywords comprises:
   computing a predictive measure of an advertising effectiveness for respective advertising keywords out of the non-final set of one or more advertising keywords; and
   filtering or constraining the non-final set based at least in part on the predictive measure of the advertising effectiveness.

9. The method of claim 1, wherein propagating the assigned degrees of activation comprises dividing up a fixed fraction of a degree of activation of a node from which activation is being propagated to all of the nodes to which the node is connected.

10. The method of claim 1, wherein the nodes represent the items and each keyword for a segment connected to an activated node is identified as a keyword suggestion based upon a respective degree of activation and a respective degree of activation.

11. A system, comprising:
   at least one processor, and
   a memory storing program instructions, wherein execution of the program instructions by the at least one processor cause the at least one processor to perform operations comprising:
      receiving, from a marketer device of a marketer, input identifying items of interest to the marketer and a respective relevance value for each of the items of interest;
      accessing, from a data store, historical information about items and about bids for keywords in association with the items, the items comprising the items of interest;
      generating, based upon the historical information, a data structure having nodes and segments connecting the nodes based upon the historical information, wherein the nodes represent the keywords and the segments represent the items, and wherein a node representing a keyword is connected to a segment representing an item based upon a bid for the keyword in association with the item;
      assigning, based upon the respective relevance value for each of the items of interest, degrees of activation to nodes of the data structure corresponding to the items of interest;
      assigning additional degrees of activation to additional nodes of the data structure by propagating the assigned degrees of activation away from each node having an assigned degree of activation until a finishing criterion has been met;
      identifying keyword suggestions for the items of interest based on the degrees of activation assigned to the nodes and the additional degrees of activation assigned to the additional nodes; and
      providing the keyword suggestions to an advertiser device and to a bidding system, the providing causing a bid from the advertiser device at the bidding system based upon predictive measures from the bidding systems for the keyword suggestions.

12. A non-transitory computer-readable storage medium storing program instructions that when executed by a computer implement:
   receiving, from a marketer device of a marketer, input identifying items of interest to the marketer and a respective relevance value for each of the items of interest;
   accessing, from a data store, historical information about items and about bids for keywords in association with the items, the items comprising the items of interest;
   generating, based upon the historical information, a data structure having nodes and segments connecting the nodes, wherein the nodes and the segments are occupied by the keywords and the items, and wherein a node is connected to a segment based upon a bid for a respective keyword in association with a respective item;
   assigning, based upon the respective relevance value for each of the items of interest, degrees of activation to nodes of the data structure corresponding to the items of interest;
   assigning additional degrees of activation to additional nodes of the data structure by propagating the assigned degrees of activation away from each node having an assigned degree of activation until a finishing criterion has been met;
   identifying keyword suggestions for the items of interest based on the degrees of activation assigned to the nodes and the additional degrees of activation assigned to the additional nodes; and
   providing the keyword suggestions to an advertiser device and to a bidding system, the providing causing a bid from the advertiser device at the bidding system based upon predictive measures from the bidding systems for the keyword suggestions.

13. A method comprising:
   receiving, by a keyword generator from a marketer device of a marketer, input identifying items of interest to the marketer and a respective relevance value for each of the items of interest;
   generating, by the keyword generator, a data structure having nodes and segments connecting the nodes, wherein the nodes and the segments are occupied by keywords and items, the items comprising previously stored items and the items of interest, the data structure storing relationships between the keywords and the items based upon a concurrent monitoring process that monitors interaction between marketer devices and a bidding system, wherein the relationships identify which keywords a group of merchants bid upon or which keywords are associated with a group of webpages, wherein connections between the nodes and the segments of the data structure represent the stored relationships between the keywords and the items;

assigning, by the keyword generator and based upon the respective relevance value for each of the items of interest, degrees of activation to nodes of the data structure corresponding to the items of interest;

assigning, by the keyword generator, additional degrees of activation to additional nodes of the data structure by propagating the assigned degrees of activation away from each node having an assigned degree of activation until a finishing criterion has been met;

identifying, by the keyword generator, keyword suggestions for the items of interest based on the degrees of activation assigned to the nodes and the additional degrees of activation assigned to the additional nodes; and providing, by the keyword generator, the keyword suggestions to an advertiser device and to the bidding system, the providing causing a bid from the advertiser device at the bidding system based upon predictive measures from the bidding systems for the keyword suggestions.

14. The method of claim 13 wherein the items are merchant entities represented as the nodes of the data structure and the keywords represented as the segments of the data structure.

15. The method of claim 13 wherein regular expressions are used to identify items.

16. The method of claim 13, wherein the relationships between the keywords and the items are based on semantic relatedness.

17. The method of claim 13 wherein the concurrent monitoring process comprises a conversion rate metric for a keyword, the conversion rate metric reflects transactions arising from the keyword.

18. The non-transitory computer-readable storage medium of claim 12, wherein receiving the input identifying the items of interest and the respective relevance value for each of the items of interest comprises:

receiving names of merchant entities as the items of interest; and receiving relevance values for each of the merchant entities, wherein previously-bid upon keywords are represented in the data structure as the nodes and the merchant entities are represented as the segments, and wherein a segment for a merchant entity connects nodes for two keywords to represent that both of the two keywords were bid upon by the merchant entity.

19. The non-transitory computer-readable storage medium of claim 12, wherein receiving the input identifying the items of interest and the respective relevance value for each of the items of interest comprises:

receiving names of merchant entities as the items of interest; and receiving relevance values for each of the merchant entities, wherein the data structure is a bipartite graph in which one set of nodes represents the merchant entities and another set of nodes represents the keywords, and wherein a segment connecting a node for a merchant entity with a node for a keyword represents that the merchant entity has bid on the keyword.

20. The non-transitory computer-readable storage medium of claim 12, wherein the nodes represent the keywords and each keyword associated with an activated node is identified as a keyword suggestion based upon a respective degree of activation and a respective degree of activation.

\* \* \* \* \*